United States Patent [19]

Yamamoto et al.

[11] 4,394,412

[45] Jul. 19, 1983

[54] COMPOSITE MEMBER COMPRISING METALLIC SHEET BENT TO BE ARCUATE IN SECTION AND RIGID SYNTHETIC RESIN COATING

[75] Inventors: Hideomi Yamamoto; Haruzo Watanabe, both of Shiga; Hidehiko Kishie, Shijonawate; Toshio Nishihara, Shiga, all of Japan

[73] Assignee: Matsushita Electric Works, Ltd., Osaka, Japan

[21] Appl. No.: 261,924

[22] Filed: May 8, 1981

[30] Foreign Application Priority Data

Mar. 31, 1981 [JP] Japan .................................. 56-48768

[51] Int. Cl.³ .......................... B32B 1/00; B32B 3/00
[52] U.S. Cl. .................................. 428/174; 428/179; 428/192
[58] Field of Search ............... 428/174, 179, 192, 183, 428/181, 581, 595, 603

[56] References Cited

U.S. PATENT DOCUMENTS 3,417,570 12/1978 Pegan et al. ...................... 428/174

Primary Examiner—George F. Lesmes
Assistant Examiner—Beverly Johnson
Attorney, Agent, or Firm—Birch, Stewart, Kolasch & Birch

[57] ABSTRACT

A length composite member comprising a metallic sheet and a rigid synthetic resin coating is bent to be arcuate in transversal section. The thickness of the metallic sheet of such composite member as bent to be arcuate in transversal section is extremely small as compared with the radius of curvature of the desired arcuate sectional curve. A plurality of small arcuate sectional bent portions in transversal section are formed distributed in the transversal or width direction of the metallic sheet. The centers of the respective curvatures of these plurality of small arcuate sectional bent portions in transversal section are selected to exist on the same side as that of the center of curvature of the composite member bent to be arcuate. The metallic sheet is generally bent in advance to be arcuate in transversal section and both main surfaces of the metallic sheet thus bent are coated with rigid synthetic resin. The thickness of the coated layers of the rigid synthetic resin is selected to be sufficiently large as compared with that of the metallic sheet.

5 Claims, 24 Drawing Figures

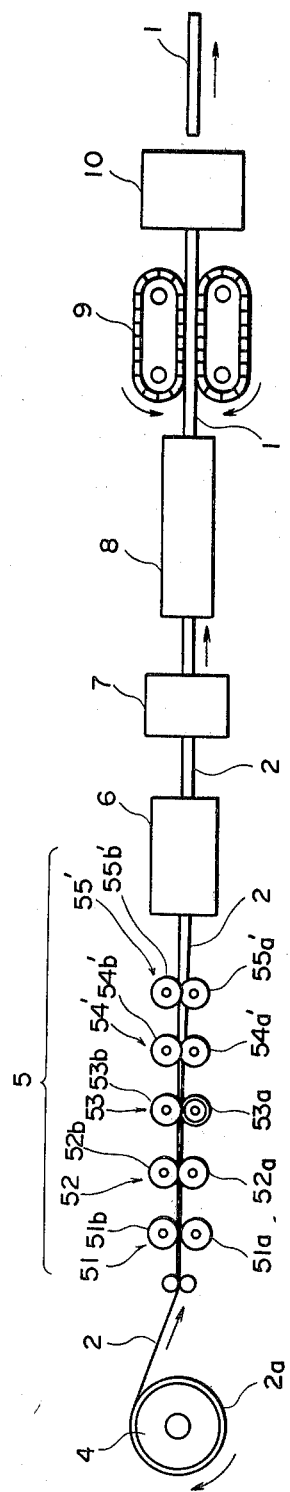
FIG. 9
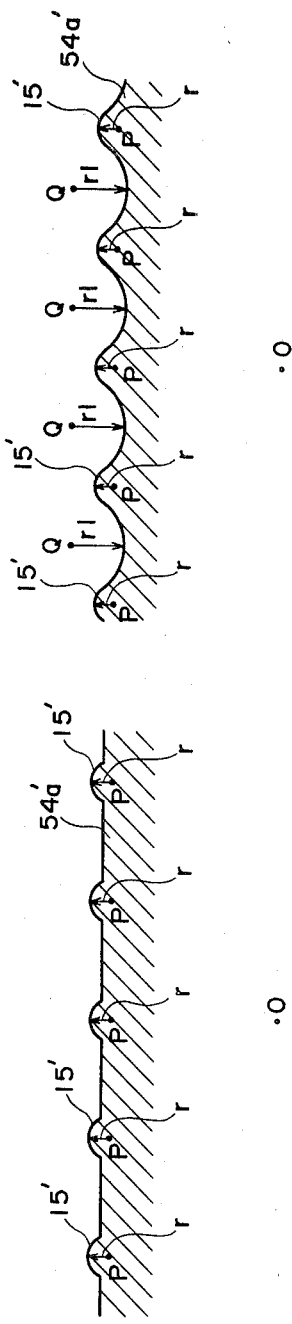
FIG. 11
FIG. 10

COMPOSITE MEMBER COMPRISING METALLIC SHEET BENT TO BE ARCUATE IN SECTION AND RIGID SYNTHETIC RESIN COATING

BACKGROUND OF THE INVENTION

1. Field of the Invention

The present invention relates to a composite member comprising a metallic sheet and a rigid synthetic resin coating. More specifically, the present invention relates to a length composite member of such as a gutter comprising a metallic sheet coated with rigid synthetic resin bent to be arcuate in transversal section or in width directional section.

2. Description of the Prior Art

In the case where a member arcuate in transversal section is fabricated only with rigid synthetic resin, such arcuate sectional member involves the shortcomings of the rigid synthetic resin per se, i.e. the shortcomings of small antishockness and liability of thermal deformation. Although such shortcomings can be overcome to some extent by selecting a material of rigid synthetic resin and the kind of an additive, the simplest and straightforward approach to that end is to increase the thickness of the arcuate sectional member. However, in consideration of the recent requirement of saving materials and energy, it is desired to provide a member of similar performance by decreasing the source material rather than simply increasing the thickness of the member. One approach which was thought of is to embed a thin metallic sheet in an arcuate sectional member made of rigid synthetic resin. More specifically, such approach fulfills the above described shortcomings of a thin rigid synthetic resin sheet by the use of a metallic sheet, while skillful use is made of anticorrosiveness, tinting power, moldability and the like which are the features of rigid synthetic resin.

In order to embed a thin metallic sheet in a rigid synthetic resin material, a preferred approach is a method of bending continuously a thin metallic sheet with several stages of forming rolls, thereby to form the same to be arcuate in transversal section with a desired curved surface and of coating both surfaces thereof with synthetic resin, inasmuch as the same can be carried out with a high production speed on a mass production basis. However, the above described method involves a problem that in the case where the thickness of a metallic sheet is extremely small as compared with the radius of curvature of the arcuate sectional member thus formed a spring back is encountered in roll forming a metallic sheet to be arcuate in section. More specifically, when a metallic sheet is bent to be arcuate in section by force and the force is removed, the sheet as deformed tends to return to the original shape due to elastic strain, thereby to cause a spring back. Therefore, in order to attain an arcuate sectional curve of a desired radius of curvature, it is necessary to bend the material in consideration of such spring back. In the case where the thickness of a metallic sheet is extremely small as compared with the radius of curvature of a desired arcuate sectional curve, it would be required to bend the metallic sheet so much as to curl the same in a cylindrical shape to lap even more than one and a half of the round. Therefore, in roll forming a metallic sheet which is extremely thin as compared with the radius of curvature of a desired arcuate sectional member to be attained, it is very difficult and becomes problematic to bend such metallic sheet. Furthermore, when such metallic sheet thus formed to be arcuate in section is coated with a rigid synthetic resin material means of extrusion molding, whereupon the same is cooled by means of a cooling means, the arcuate sectional member after cooling does not become a desired geometry (radius of curvature, width, height and the like) unless the same is cooled in consideration of a spring back of such metallic sheet, and furthermore, when heat is applied to the arcuate sectional member after cooling and the rigid synthetic resin becomes soft, the arcuate sectional member is deformed to stretch due to a spring back of the metallic sheet, with the result that the above described method still involves a disadvantage that a stabilized shape can be hardly maintained.

SUMMARY OF THE INVENTION

The present invention comprises a composite member comprising a metallic sheet coated with a rigid synthetic resin material, wherein the metallic sheet is formed to be generally arcuate in transversal section before the same is coated with the synthetic resin material, whereupon a plurality of small arcuate sectional bent portions are formed extending in the longitudinal direction and distributed in the transversal direction such that the center of curvature of each of the small arcuate sectional bent portions may be positioned on the same side as that of the center of curvature of the arcuate sectional curve in transversal section of the composite member, whereupon the metallic sheet bent to be arcuate in transversal section is coated with the rigid synthetic resin material.

According to the present invention, even in bending or curving a metallic sheet to be arcuate in transversal section prior to the step of coating the same with a rigid synthetic resin material, a spring back is decreased as a function of a plurality of small arcuate sectional bent portions extending in the longitudinal direction and distributed in the transversal direction or the width direction, which more facilitates formation of a metallic sheet in curvature to be arcuate in transversal section. Furthermore, even after the step of coating the rigid synthetic resin material, little spring back is caused in the metallic sheet, which simplifies cooling of the synthetic resin layers and enables maintenance of the composite member after cooling in an extremely stabilized form of curvature, i.e. of being arcuate in transversal section. Formation of a plurality of small arcuate sectional bent portions extending in the longitudinal direction and distributed in the transversal direction or the width direction enhances the tensile strength of a metallic sheet in continuously forming such composite member, with the result that workability and facility of formation are much enhanced.

In a preferrred embodiment of the present invention, those in-between portions between the two adjacent small arcuate sectional bent portions extending in the longitudinal direction and distributed in the width direction are further curved or bent to be arcuate in transversal section with a relatively large radius of curvature. The in-between arcuate sectional portions between the above described small arcuate sectional bent portions are curved such that the center of curvature of each of the in-between arcuate sectional portion exists on the side opposite to the center of curvature with which the composite member per se is curved. Formation of those in-between arcuate sectional portions between the plurality of small arcuate sectional bent portions in such curvature as to be arcuate in transversal section in the direction opposite to the direction of curvature of the composite member per se more facilitates formation of the plurality of small arcuate sectional bent portions and further decreases a possible spring back in the metallic sheet.

In fabricating such a composite member as described above, a metallic sheet is in advance roll formed prior to the step of coating the same with a rigid synthetic resin material. Two approaches are available in performing such roll forming step. One of them comprises the steps of bending a metallic sheet as a whole to be arcuate in transversal section or in width section and thereafter forming a plurality of small arcuate sectional bent portions as described above on the thus bent metallic sheet. The other method comprises the steps of forming a plurality of small arcuate sectional bent portions on a flat metallic sheet and then bending the metallic sheet having the plurality of small arcuate sectional bent portions formed to be arcuate as a whole in transversal section. According to the latter mentioned method, the plurality of small arcuate sectional bent portions can be uniformly formed in forming the small arcuate sectional bent portions. Furthermore, after the plurality of small arcuate sectional bent portions are formed on a flat metallic sheet, the metallic sheet is naturally curved as a whole to be a desired arcuate sectional curvature. Therefore, the step of roll forming the metallic sheet to curve the same as a whole to be arcuate in transversal section is simplified and accordingly the fabricating facilities and the space for fabrication may be small.

Accordingly, a principal object of the present invention is to provide a composite member comprising a metallic sheet bent with little possibility of spring back and a rigid synthetic resin coating covering the same.

One aspect of the present invention resides in a composite member comprising a metallic sheet and a rigid synthetic resin coating thereof, wherein the metallic sheet is formed with a plurality of small arcuate sectional bent portions extending in the longitudinal direction and distributed in the transversal or width direction of the metallic sheet and is bent to be arcuate in transversal section, with the centers of the curvatures of these small arcuate sectional bent portions selected to exist on the same side as that of the center of the curvature to be arcuate in transversal section of the composite member.

Another aspect of the present invention resides in a composite member comprising a metallic sheet and a rigid synthetic resin coating thereof, wherein the metallic sheet can be curved or bent with extreme simplicity and stability.

A further aspect of the present invention resides in a composite member comprising a metallic sheet and a rigid synthetic resin coating thereof, wherein the metallic sheet is curved or bent with stability to be arcuate in transversal section in and after coating the metallic sheet with a rigid synthetic resin material.

Still a further aspect of the present invention resides in a process for manufacturing a composite member comprising a bent metallic sheet and a rigid synthetic resin coating thereof with excellent productivity.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7A to 7G are sectional views showing the states after formation of a metallic sheet at the respective steps of the FIG. 2 embodiment;

FIG. 9 is a block diagram showing another embodiment of an apparatus for manufacturing the FIG. 1 composite member;

FIGS. 10 and 11 are enlarged partial sectional views showing examples of a lower forming roll for use in the FIG. 9 embodiment.

DESCRIPTION OF THE PREFERRED EMBODIMENTS

Figure 1:
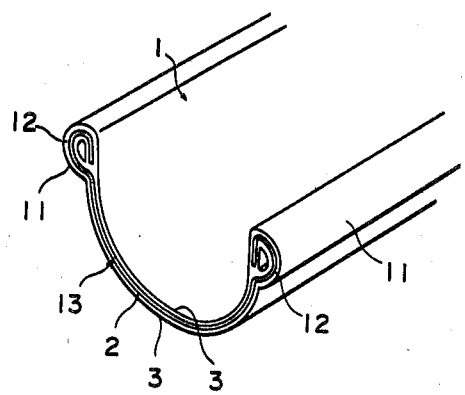
FIG. 1 is a perspective view of a gutter which is an example of a composite member in accordance with the present invention.

FIG. 1 is a perspective view of an end portion of one embodiment of a composite member in accordance with the present invention. Specifically, the composite member 1 comprises a gutter. The composite member 1 comprises a metallic sheet 2 of 0.15 mm in thickness, for example, bent to be arcuate in transversal section with the radius of curvature of 50 mm, both side edges being inwardly curved to form curled portions 12. Although not shown in FIG. 1, the composite member 1 is further formed with a plurality of small arcuate sectional bent portions or protuberances protruding downward as viewed in FIG. 1 and extending in parallel in the longitudinal direction and distributed in the transversal or width direction. The composite member 1 further comprises a coating 3 of rigid synthetic resin covering the whole outer surface, i.e. both main surfaces of the metallic sheet 2. The radius of curvature of each of the small arcuate sectional protuberances is 0.5 mm, for example, and in the embodiment shown eleven small arcuate sectional protuberances are formed extending in parallel in the longitudinal direction by means of a lower forming roll 54a shown in FIGS. 3 and 4. The width of the metallic sheet 2 before the same is curved is 180 mm, for example.

As shown in FIG. 1, the inventive composite member may employ a metallic sheet and a rigid synthetic resin material conventionally employed. More specifically, the metallic sheet 2 may comprise a sheet of metal such as iron, aluminum, copper or the like and in particular, in case of an iron a cool rolled steel sheet, a stainless steel sheet and the like may be used. The rigid synthetic resin coating 3 may be of vinyl chloride resin, acrylic resin, AAS resin, ABS resin or the like, in which an additive, a filler and the like may be admixed as desired.

The purpose of forming the curled portions 12 is to prevent deformation like corrugation at both sides of the curved metallic sheet 2 after roll forming and to prevent deformation like corrugation at both sides of a gutter which is a final product of an embodiment of the present invention. The geometry of the curled portions 12 may be determined to be optimal depending on a final product of the embodiment.

Figure 2:
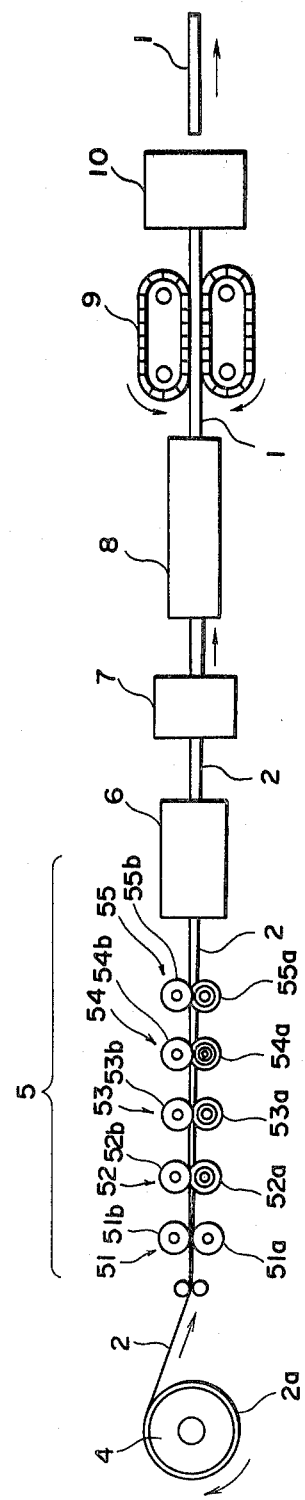
FIG. 2 is a block diagram showing one embodiment of an apparatus for manufacturing a composite member as shown in FIG. 1.
Figure 7A:

FIG. 2 is a block diagram showing an apparatus for manufacturing the composite member 1 shown in FIG. 1. In order to improve the adhesiveness of a rigid synthetic resin coating to the metallic sheet, an adhesive agent is coated on both main surfaces of the metallic sheet 2 before forming as shown in FIG. 7A and is dried. Thereafter the metallic sheet 2 is wound in a coil and is set on an uncoiler 4. The uncoiler 4 is not coupled to a driver such as a motor, so that the same may be freely rotated. Accordingly, when the metallic sheet 2 is drawn in the arrow direction by means of a drawer 9, the uncoiler 4 is rotated to unwind and yield the metallic sheet 2. The metallic sheet 2 fed from the uncoiler 4 is formed to be arcuate in transversal or width section with a desired curvature, as shown in FIG. 7E, by means of a roll forming machine 5. The roll forming machine 5 comprises five-stage forming rolls 51, 52, 53, 54 and 55 arranged to be paired as upper and lower, although the number of stages may be selected to be several stages to several tens stages as necessary.

Figure 3:
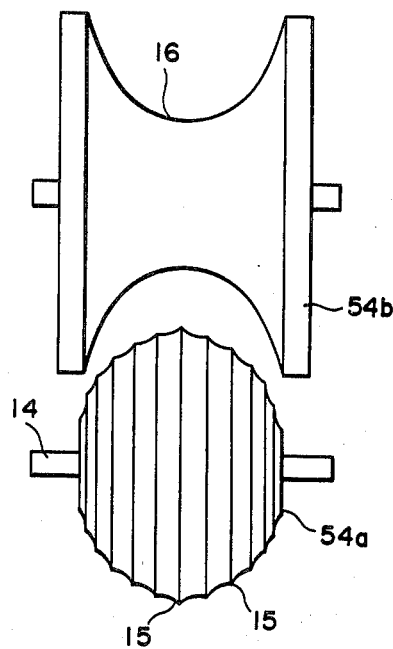
FIG. 3 is a front view showing one example of an upper and lower forming rolls of a roll forming machine.
Figure 8:
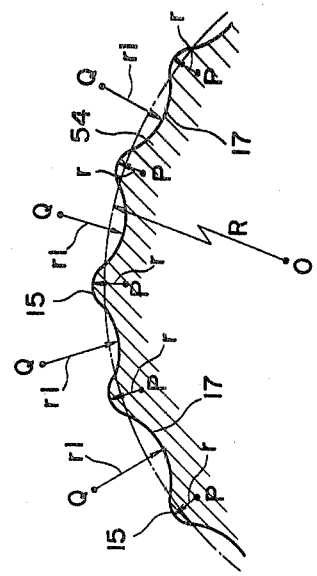
FIG. 8 is an enlarged partial sectional view of another example of a lower forming roll.
Figure 4:
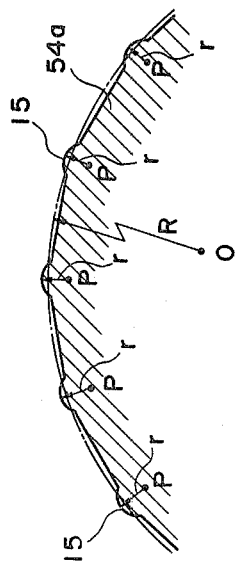
FIG. 4 is an enlarged partial sectional view showing one example of a lower forming roll.
Figure 7B:
Figure 7C:
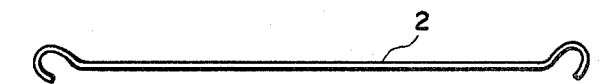
Figure 7G:
Figure 7E:
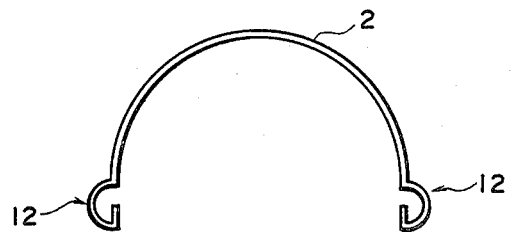
Figure 7F:
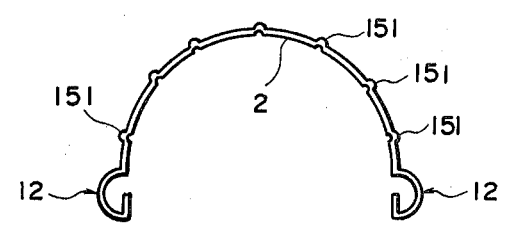
Figure 7G:
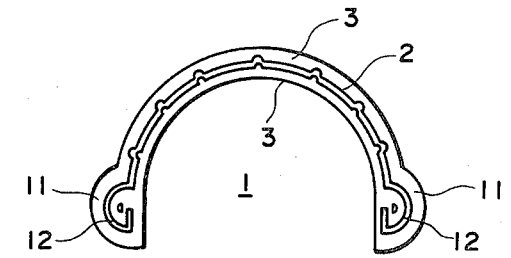

In the embodiment shown, the three forming rolls 51, 52 and 53 at the earlier stages are used to form the curled portions 12 in the metallic sheet 2 in succession as shown in FIGS. 7B, 7C and 7D, while the forming rolls 54 and 55 at the latter stages are used to bend the metallic sheet 2 as shown in FIG. 7E and to form a plurality of small arcuate sectional protuberances 151 shown in FIG. 7F in the curved portion 13 of the metallic sheet 2. The forming rolls 54 and 55 at the latter are substantially the same configuration and the forming roll 54 comprises a lower forming roll 54a and an upper forming roll 54b, as shown in FIG. 3, the lower forming roll 54a being made of metal. As shown in FIG. 4 or 8, the lowr forming roll 54a is shaped such that a section taken in the plane in parallel with a rotational shaft 14 (FIG. 3) and including the said rotational shaft is arcuate with the radius R of curvature with a plurality of (five in each of FIGS. 4 and 8) small arcuate sectional portions formed on the said arcuate sectional portion each with a small radius r of curvature protruding outward from the arcuate sectional portion. Accordingly, the center O of curvature and the centers P of curvature are positioned on the same side with respect to the metallic sheet. FIGS. 4 and 8 show the above described section and accordingly it follows that the respective small arcuate sectional portions 15 are formed as annular protuberances extending around the rotational periphery (arcuate in section) of the lower forming roll 54a.

By way of an example, the radius R of curvature of the large arcuate sectional curve is 50 mm and the radius r of curvature of the small arcuate sectional portions 15 is 0.5 mm in the embodiment shown.

In the foregoing the sectional configuration of the lower forming roll 54a shown in FIG. 4 was described as arcuate in section with the radius R of curvature for facility of description; however, in actuality those in-between portions between the adjacent two small arcuate sectional portions 15 each having the radius r of curvature are not arcuate but rather linear. In the case of the another embodiment of the lower forming roll 54a shown in FIG. 8, instead those in-between portions between the two adjacent small arcuate sectional portions 15 are formed to be arcuate as at 17 in section of the radius r1 of curvature with the centers Q of curvature on the side opposite to that of the center O of curvature of the above described radius R of curvature with respect to the large arcuate sectional curve. The radius r1 of curvature of the arcuate sectional curve 17 of the in-between portions may be 2 to 10 mm. The rotational periphral surface of the lower forming roll 54a is suitably plated to improve contact with the metallic sheet 2.

As shown in FIG. 3, the rotational peripheral surface of the upper forming roll 54b is formed with an arcuate sectional concave groove 16 corresponding to the arcuate sectional convex curve of the lower forming roll 54a and the surface of the arcuate sectional groove 16 for contact with the lower forming roll 54a is formed with hard rubber. By hard rubber, it is intended to mean hard urethane rubber, butyl rubber, silicon rubber, natural rubber and the like and the hardness thereof may be properly selected in consideration of the material, the thickness and the like of the metallic sheet 2; however, in the embodiment shown hard urethane of the hardness of 70 to 80 is adhered onto the surface of the arcuate sectional groove 16 with the thickness of 5 to 10 mm.

The metallic sheet 2 coming out of the forming rolls 51, 52 and 53 at the earlier stages has the curled portions 12 formed as shown in FIG. 7D and is then entered into the forming rolls 54 and 55 at the latter stages, when the curved portion 13 of the metallic sheet is strongly pressed toward the hard rubber portion of the upper forming roll 54b by means of the lower forming roll 54a. As a result, the curved portion 13 is pressed in part to make inroad into the hard rubber portion by means of the small arcuate sectional portions 15 of the lower forming roll 54a, whereby a plurality of small arcuate sectional protuberances are formed in the curved portion 13.

By using the lower forming roll 54a as shown in FIG. 8, the curved portion 13 of the metallic sheet 2 can be strongly pressed toward the upper forming roll 54b inasmuch as the in-between arcuate sectional portions 17 with the radius r1 of curvature and the small arcuate sectional portions 15 with the radius r of curvature are protruded in the directions opposite to each other, with the result that formation of the small arcuate sectional protuberances on the metallic sheet 2 is facilitated. However, in such a case, the in-between arcuate sectional curves between the small arcuate sectional protuberances of the metallic sheet 2 deformed by the arcuate sectional portions 17 with the radius r1 of curvature are preferably mitigated with the forming roll 55 at the following step.

Returning again to FIG. 2, the metallic sheet 2 formed to a desired arcuate sectional curve by means of the roll forming machine 5 is caused to pass through a preheater 6 at the following step. At that time the adhesive agent coated in advance on the metallic sheet 2 and dried is preheated by the heater of the preheater 6. The temperature of the preheater 6 is selected to be a value close to a coating temperature of the rigid synthetic resin material and the metallic sheet 2 and the adhesive agent on both main surfaces are heated to that temperature. In the case where rigid vinyl chloride resin is employed, such temperature would be 170° C. to 180° C. In the case where the metallic sheet 2 has not been coated with an adhesive agent, a coating apparatus for coating an adhesive agent on both main surfaces of the metallic sheet 2 is disposed at the position of the preheater 6. The coating apparatus may be such an apparatus as a roll coater or the like.

The adhesive agent may be of an acrylic resin group, an epoxy resin group, a vinyl chloride group, a group of vinyl chloride-vinyl acetate copolymer or the like.

Figure 5:
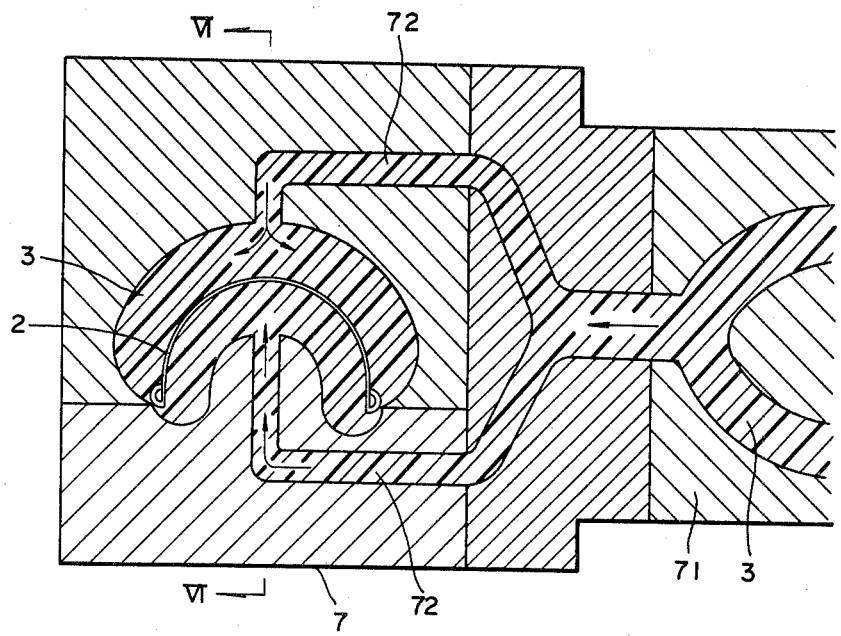
FIG. 5 is a sectional view showing one example a mold for coating a metallic sheet with a rigid synthetic resin material.
Figure 6:
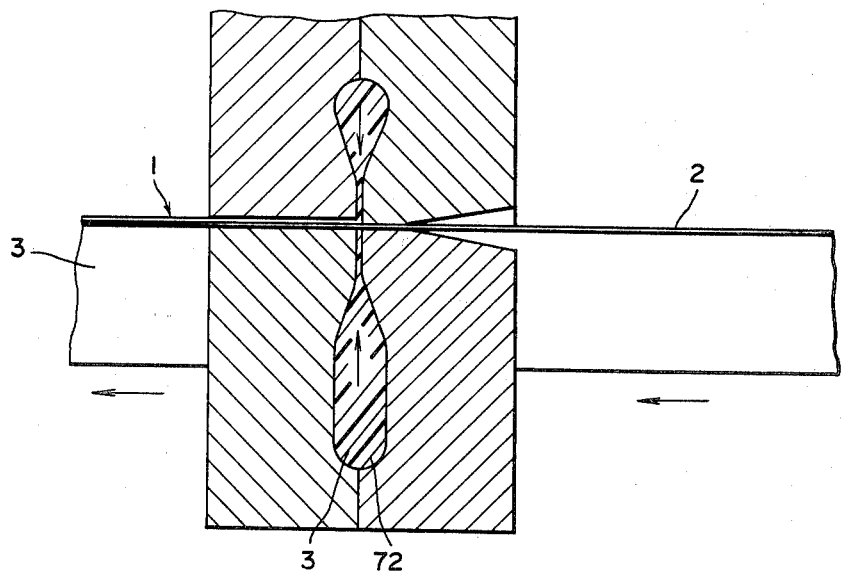
FIG. 6 is a sectional view taken along the line VI—VI in FIG. 5.

After the metallic sheet formed to be arcuate in transversal section is preheated by the preheater 6, the resin material is coated on the metallic sheet by means of a rigid synthetic resin coating mold 7 (FIGS. 5 and 6). More specifically, both surfaces of the metallic sheet 2 are coated with the rigid synthetic resin material 3 extruded from an extruder 71 in the direction normal to the traveling direction of the metallic sheet 2, whereby a composite member 1 is provided. FIG. 5 is a transversl sectional view of the mold 7 and FIG. 6 is a sectional view taken along the line VI—VI in the FIG. 5 mold 7. The molten resin extruded from the extruder 71 is fed through the resin path 72 to coat at least both main surfaces of the metallic sheet 2, as shown in FIG. 7G, passing through a slit in the mold 7. A molding temperature of the rigid synthetic resin is approximately 190° C. to 210° C. and the temperature of the coated layer of the rigid synthetic resin 3 of the composite member 1 immediately after passage through the mold 7 would be approximately 170° C. to 180° C.

The composite member 1 passing through the mold 7 is then rapidly cooled by means of a cooling means 8. Since it follows that the metallic sheet 2 is included in the cooling means 8 as a core material, no sizing mold is required and specifically means for directly passing the composite member 1 through a water tab or means for passing the same while water is sprayed is employed, the latter mentioned means being more effective in rapidly cooling the composite member 1.

After passing through the cooling means 8, the composite member 1 is drawn by means of a drawer 9. The drawer 9 is driven by a prime mover such as a motor, while the composite member 1 is sandwiched from upward and downward by means of a chuck of hard rubber and is fed. More specifically, in the case of the manufacturing apparatus of the embodiment, the metallic sheet or the composite member 1 are continually fed to travel by means of the drawer 9. The traveling speed is selected to be 10 to 20 m/min.

Now the composite member 1 is cut to a predetermined length by means of a cutter 10. The cutter 10 is provided with a detector such as a limit switch, photodetector, or the like, such that when the composite member 1 reaches the position of the detector the same is detected by the detector to be cut into a predetermined length.

Since the metallic sheet 2 is wound in a coil and is mounted to the uncoiler 4 in continually forming the composite member 1, the whole apparatus is brought to a stop when the metallic sheet 2 runs out. In order to continually achieve the forming operation, therefore, a jointing means, such as a welder, is provided between the uncoiler 4 and the roll forming machine 5 for jointing the trailing end of the metallic sheet 2 and the leading end of the following metallic sheet 2 wound in a coil and mounted to the uncoiler 4. A press for punching the metallic sheet 2 may be provided at the same position, in which case the rigid synthetic resin coated on both surfaces of the metallic sheet 2 is made integral by fusion through the punched apertures of the metallic sheet, thereby to considerably enhance the coating strength.

In the embodiment shown, the metallic sheet 2 formed to be arcuate in transversal section by means of the roll forming means (the roll forming machine 5) has an extremely small thickness t as compared with the radius R of curvature of the desired arcuate sectional curve, in which the ratio thereof may be expressed by the following formula:

$$(t/R) < 0.01$$

Referring to the relation expressed by the foregoing formula, according to the conventional approach, even if the metallic sheet 2 is curved with the radius R of the curvature, the metallic sheet 2 is liable to stretch due to a spring back of elastic strain when the curving force is removed, with the result that a desired arcuate sectional curve is not attained; however, according to the present invention, the metallic sheet is formed to be arcuate in transversal section by means of the roll forming means such that a plurality of small arcuate sectional bent portions are formed on the desired arcuate curved plane such that the centers P of curvature of the small arcuate sectional bent portions may be positioned on the same side as that of the center O of curvature of the desired arcuate sectional curved plane and, therefore, a spring back is little caused and the desired arcuate sectional curvature is attained with stability. More specifically, by way of one example, according to the present invention such advantage is effectively brought about in the case where the thickness of the metallic sheet 2 is smaller than (1/100) of the radius R of curvature of the desired arcuate sectional member 1.

More specifically, the present invention brings about the advantage that formation of small arcuate sectional bent portions on a metallic sheet relatively increases a ratio of the thickness t of the metallic sheet to the radius R of curvature of an arcuate sectional curve of the metallic sheet even in the case where the thickness t of the metallic sheet 2 is very small as compared with the radius R of curvature of the arcuate sectional curve of the metallic sheet, with the result that a spring back is little caused due to the small arcuate sectional bent portions even after the force is removed after formation through roll forming and hence the arcuate sectional curve is stable even after the metallic sheet is coated with a rigid synthetic resin material.

Now a specific example of the composite member of a gutter shown will be more specifically described. The metallic sheet 2 may be of a cool rolled steel sheet (SPCC) of the thickness t of 0.15 mm and the radius R of curvature of the arcuate sectional curve of the desired arcuate sectional member 1 is 50 mm. In such a case, assuming that the radius r of curvature of the small arcuate sectional bent portions of the lower forming roll 54a of the forming roll 54 is 0.5 mm and the radius r1 of curvature of the in-between arcuate sectional curves between the two adjacent small arcuate sectional bent portions is 6 mm or the small arcuate sectional bent portions are formed at the angular intervals of 3° to 5°, the metallic sheet 2 can be formed to attain the desired radius R of curvature being 50 mm through roll forming.

In the case of the above described FIG. 2 embodiment, after the metallic sheet 2 is bent or curved in transversal or width section, as shown in FIGS. 7A to 7G, the same is further formed with the small arcuate sectional bent portions 151 by means of the forming roll 54. However, in the case where the metallic sheet 2 is formed with the small arcuate sectional portions 151 after bending the same, it was observed through experimentation by the inventors that the following problem is involved. More specifically, since the metallic sheet 2 is a very thin steel sheet the thickness t of which is as small as 0.15 mm, it is difficult to make uniform the gap between the two rolls 54a and 54b, if such forming roll 54 as shown in FIG. 3 is employed. Therefore, a depressing force onto the upper forming roll 54b becomes non-uniform among a large diameter portion and a small diameter portion of the lower forming roll 54a as shown in FIG. 3, which makes non-uniform the geometry of each of the thus formed small arcuate sectional protuberances 151, which is further liable to cause deformation. More specifically, although the metallic sheet 2 as curved as shown in FIG. 7E is pressed relatively strongly at the central portion thereof by means of the two rolls 54a and 54b, the pressing force is insufficient at the side end portion and is not enough to fully bend the side end portion. Therefore the geometry of the small arcuate sectional bent portions becomes non-uniform, although the same should be inherently uniform.

Under the circumstances, according to another embodiment of the present invention, as shown in FIGS. 12A to 12G, the metallic sheet 2 is first formed with small arcuate sectional bent portions 151′ while the same is in a flat state, whereupon the metallic sheet is curved in transversal or width section.

Figure 12A:
FIGS. 12A to 12G are sectional views showing the states after formation of a metallic sheet at the respective steps of the FIG. 9 embodiment.
Figure 12B:
Figure 12C:
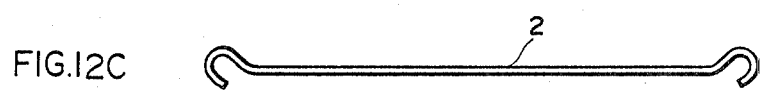
Figure 12D:
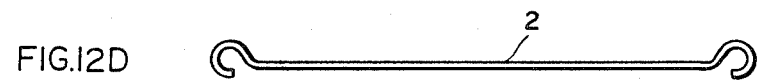
Figure 12E:
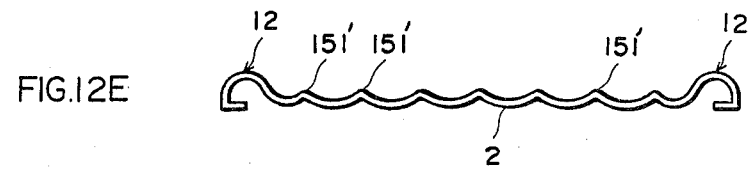
Figure 12F:
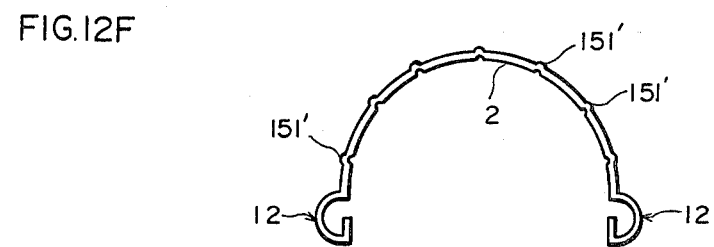
Figure 12G:
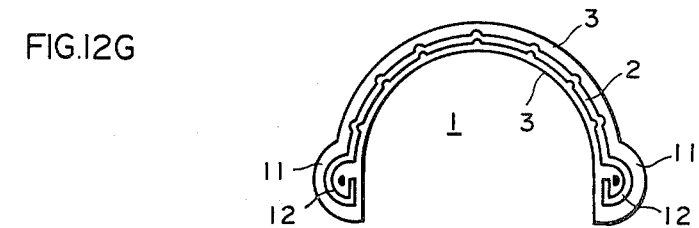

FIG. 9 is a block diagram showing another embodiment of an apparatus for manufacturing the FIG. 1 composite member. The FIG. 9 embodiment comprises a forming roll 54′, which is different from that of the FIG. 2 embodiment. More specifically, the lower forming roll 54a′ included in the forming roll 54′ of the FIG. 9 embodiment comprises a flat outer contour line as shown in FIGS. 10 and 11, for example. The upper forming roll 54b′ corresponding to such lower forming roll 54a′ is also made to be flat at the peripheral side surface, as a matter of course, although the same is not shown. The metallic sheet 2 is formed with small arcuate sectional protuberances 151′ while the same is in a flat state, as shown in FIG. 12E, by the use of the forming roll 54′. At that stage the radius of curvature of the arcuate sectional curve in transversal section of the composite member is determined in consideration of the material of the metallic sheet 2, the radius r1 of curvature (FIG. 11) and the pressing force of the forming roll 54′. By forming the small arcuate sectional protuberances on the metallic sheet 2 while the same is in a flat state, the metallic sheet 2 can be thereafter curved to be arcuate in transversal section of a desired curve, as shown in FIG. 12F, without passing the same through any particular forming roll. Therefore, according to the embodiment shown, a forming roll for curving the metallic sheet as shown in FIG. 12F is not necessarily required but the metallic sheet 2 is inserted into the mold 7 through the guide roll 55′ of a desired sectional curve before the same is coated with a rigid synthetic resin material.

The FIG. 9 embodiment in which the small arcuate sectional protuberances are formed on the metallic sheet 2 while the same is in a flat state brings about the following advantage as compared with the FIG. 2 embodiment. More specifically, since the peripheral side surface of both of the lower forming roll 54a′ and the upper forming roll 54b′ of the forming roll 54′ are generally flat (disregarding convexes and concaves for forming the small arcuate sectional protuberances), the pressing force is uniformly applied throughout the width direction of the metallic sheet and therefore the small arcuate sectional protuberances 151′ thus formed also become uniform. Furthermore, since the forming roll 54′ need not be bent as shown in FIG. 3, manufacture is facilitated and accordingly a manufacturing cost is decreased. Furthermore, although such forming roll 54′ as shown in FIG. 3 necessitates tiresome maintenance in order to secure positioning accuracy, the embodiment now in description of the forming roll 54′ having a flat outer peripheral surface much simplifies such maintenance. In addition, when the metallic sheet 2 is formed with small arcuate sectional protuberances while the same is in a flat state as shown in FIG. 12E, as described previously, the metallic sheet 2 tends to be naturally bent or curved as shown in FIG. 12F. Therefore, such a forming roll as shown in FIG. 12F for forming the metallic sheet 2 to be arcuate in transversal section may be dispensed with and such forming step is simplified and the manufacturing facility and space therefore are also decreased. By way of an example, according to the FIG. 2 embodiment, approximately twelve stages of forming rolls are required from the FIG. 7A state to the FIG. 7D state and in addition three more forming rolls are required to attain the FIG. 7E state and two further forming rolls are required to attain the FIG. 7F state. By contrast, according to the FIG. 9 embodiment, from the FIG. 12A to FIG. 12D corresponding FIGS. 7A to 7D, the same number of stages are required but thereafter only one stage of forming roll is required for each of FIGS. 12E and 12F.

Now another embodiment of the inventive composite member will be described. Rigid synthetic resin may be the same as that of the previously described embodiment. The metallic sheet 2 is of DR-8 of the AISI standard, the hardness being "73" in terms of the Rockwell hardness $H_R$–30T. The width between the curled portions 12 at both sides of the metallic sheet 2 is 140 mm, the thickness t being 0.15 mm. The lower forming roll 54a′ of the forming roll 54′ is selected such that the radius r of curvature in FIG. 11 is 0.5 mm and the radius r1 of curvature is 5.7 mm. The interval of the small arcuate sectional protuberances 151′ formed on the metallic sheet 2 was selected to be 2.6 mm. The interval between the small arcuate sectional protuberances is changed depending on the radius r1 of curvature. The angle of the small arcuate sectional protuberances 151′ with respect to the center of curvature of the composite member 1 was 3°. The thickness of the whole composite member 1 was selected to be 1.0 mm. It is pointed out that the above described values are merely an example of the inventive composite member which was employed in experimentation made by the inventors.

Meanwhile, in the foregoing description the arcuate curve in transversal section of the composite member was considered to be typically as a portion of a circle. However, it is pointed out that for the purpose of the present invention a portion of a curve similar to a circle, such as a portion of the periphery of an ellipse, a portion of the periphery of a parabola, or the like may be employed as the arcuate curve in transversal section of the composite member. Accordingly, the terms "arcuate" and "the center of curvature" used in the disclosure and the appended claims are intended to cover any types of such curvature and the center of such curvature. For example, even in the case where the arcuate curve in transversal section of the composite member is of a curve the center of curvature of which is not primarily determinable, there could exist a plurality of centers of curvature on the assumption that such curvature is divided into a plurality of sections each being similar to a portion of the periphery of a circle having its own center of curvature, in which case a group of such plurality of centers of curvature may be generally considered as a center of curvature in terms of the present invention.

In the foregoing description the plurality of arcuate sectional protuberances were described as formed distributed in the transversal direction and extending continually in the longitudinal direction; however, all of these small arcuate sectional protuberances need not necessarily extend continually throughout the full length of the composite member and instead each of the protuberances may be separate at intervals in the longitudinal direction so that the same may be discontinuous in the longitudinal direction in a modification of the present invention. More specifically, it is intended that the present invention covers both an embodiment in which a plurality of protuberances are continuous throughout the full length of the composite member and another embodiment in which the protuberances are separate at intervals in the longitudinal direction to be discontinuous. In the case of the latter mentioned embodiment, however, it is preferred that the protuberances are separated at intervals at dislocated positions, with respect to the adjacent ones, in the longitudinal direction rather than at the same position in the longitudinal direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite member bent to be arcuate in transversal section, comprising:
    a metallic sheet bent to be arcuate in transversal section with respect to a first center of curvature and formed with a plurality of small arcuate sectional protuberances extending in the longitudinal direction and distributed only in the transversal direction, each of said small arcuate sectional protuberance being curved with respect to a second center of curvature,
    said first center of curvature and each said second center of curvature being selected to be positioned on the same side with respect to said metallic sheet, and
    a rigid synthetic resin layer covering both main surfaces of said metallic sheet, said composite member being formed in a length,
        the length of said metallic sheet being selected to be substantially the same as the length of said length of the composite member, and
        said plurality of small arcuate sectional protuberances being formed as protuberances extending continuously throughout the length of said metallic sheet.

2. A composite member in accordance with claim 1, wherein
    said metallic sheet are further formed with in-between arcuate sectional curved portions between the respective adjacent small arcuate sectional protuberances, each of said in-between arcuate sectional curved portions being curved with respect to a third center of curvature selected to be located on the side opposite to that of said first center of curvature with respect to said metallic sheet.

3. A composite member in accordance with any one of the preceding claims, wherein
    said plurality of small arcuate sectional protuberances are distributed equispaced throughout the width of said metallic sheet.

4. A composite member in accordance with claim 1, wherein
    said metallic sheet is curved with a first radius of curvature to be arcuate in transversal section with respect to said first center of curvature, and
    the thickness of said metallic sheet is selected to be smaller than 1/100 of said first radius of curvature of said arcuate sectional curve with respect to said first center of curvature.

5. A composite member in accordance with claim 1, which further comprises
    an adhesive agent formed between said metallic sheet and said rigid synthetic resin layer for improving adhesiveness therebetween.

* * * * *